US010051395B2

(12) United States Patent
Kim et al.

(10) Patent No.: US 10,051,395 B2
(45) Date of Patent: Aug. 14, 2018

(54) ACCESSORY MANAGEMENT AND DATA COMMUNICATION USING AUDIO PORT

(71) Applicant: Maxim Integrated Products, Inc., San Jose, CA (US)

(72) Inventors: Sang Hoon Kim, Glenview, IL (US); Kenneth Jay Helfrich, Peachtree Corners, GA (US)

(73) Assignee: Maxim Integrated Products, Inc., San Jose, CA (US)

( * ) Notice: Subject to any disclaimer, the term of this patent is extended or adjusted under 35 U.S.C. 154(b) by 16 days.

(21) Appl. No.: 14/507,605

(22) Filed: Oct. 6, 2014

(65) Prior Publication Data

US 2015/0261641 A1 Sep. 17, 2015

Related U.S. Application Data

(60) Provisional application No. 61/953,454, filed on Mar. 14, 2014.

(51) Int. Cl.
*G06F 3/00* (2006.01)
*G06F 13/12* (2006.01)
*H04R 29/00* (2006.01)
*H04M 1/00* (2006.01)

(52) U.S. Cl.
CPC ..... *H04R 29/004* (2013.01); *H04R 2201/107* (2013.01); *H04R 2420/05* (2013.01); *H04R 2420/09* (2013.01)

(58) Field of Classification Search
CPC .. G06F 11/3041; G06F 3/162; G06F 11/3051; H04R 1/1041; H04R 29/004; H04R 29/001; H04M 1/05; H04M 1/6058
USPC ..................... 710/11, 15–16, 62; 381/58, 74; 340/13.27; 370/311, 390; 455/557; 379/388.01–388.02
See application file for complete search history.

(56) References Cited

U.S. PATENT DOCUMENTS 4,589,136 A * 5/1986 Poldy ..................... H03G 5/18 381/112
5,308,936 A * 5/1994 Biggs ..................... G06F 3/043 178/18.04
5,896,450 A * 4/1999 Kurihara ................ H04M 9/08 379/388.02
8,412,268 B2 * 4/2013 Inha .................... H04M 1/6058 348/14.01
2005/0105717 A1 * 5/2005 Lawrie ................. H03G 7/007 379/388.01
2007/0211721 A1 * 9/2007 Thijssen ............. H04M 1/6058 370/390

(Continued)

*Primary Examiner* — Farley Abad
*Assistant Examiner* — Henry W Yu
(74) *Attorney, Agent, or Firm* — North Weber & Baugh LLP

(57) ABSTRACT

A method for accessory management and data communication between a portable electronic device and an accessory via audio port is disclosed. The method involves using a microphone line of the accessory in different communication modes including a MIC data mode and a power mode. In the MIC data mode, the MIC line disconnects from a microphone load to operate on a voltage above a predetermined threshold whenever the accessory needs to communicate with the host electronic device. In the MIC power mode, the MIC line connects with the microphone load for the normal operation of the microphone.

15 Claims, 8 Drawing Sheets

Accessory Communication by MIC line if the host chooses to do so

(56) References Cited

U.S. PATENT DOCUMENTS

| | | | | | |
|---|---|---|---|---|---|
| 2008/0024140 | A1* | 1/2008 | Henson | H02H 1/0015 | 324/536 |
| 2008/0123577 | A1* | 5/2008 | Jaakkola | H04W 52/0225 | 370/311 |
| 2008/0318629 | A1* | 12/2008 | Inha | H04M 1/6058 | 455/557 |
| 2009/0179768 | A1* | 7/2009 | Sander | H04M 1/05 | 340/13.27 |
| 2010/0303251 | A1* | 12/2010 | Im | H04R 1/1041 | 381/74 |
| 2011/0013785 | A1* | 1/2011 | Kim | H03G 3/32 | 381/107 |
| 2011/0051941 | A1* | 3/2011 | Gratke | H04R 29/004 | 381/58 |
| 2012/0014531 | A1* | 1/2012 | Yamkovoy | H04M 1/6066 | 381/71.1 |
| 2012/0200172 | A1* | 8/2012 | Johnson | H04R 29/001 | 307/116 |
| 2013/0129116 | A1* | 5/2013 | Kropfitsch | H04R 19/005 | 381/107 |

* cited by examiner

SYSTEM OPERATING REGION DIAGRAM

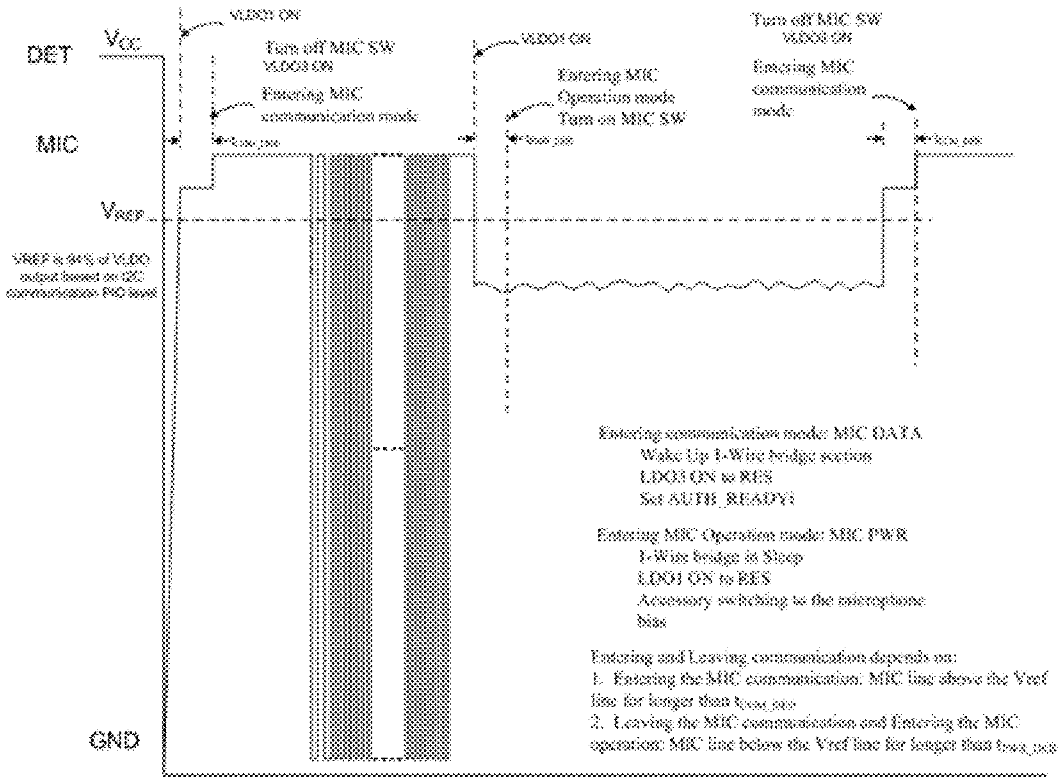

- Host (AP or controller)
  - To control the MIC supply with proper impedance for each operation mode
  - To start communication if the predetermined MIC line condition is met.
  - To end the communication if the predetermined MIC line condition is met.
- Accessory
  - To set the MIC line to be in high impedance to indicate its readiness for communication
  - To load the MIC line to indicate its readiness for exiting communication.
- Communication Methods examples
  - 1-wire
  - Above audible frequency modulation AC coupled on MIC line.

FIG. 8

ACCESSORY MANAGEMENT AND DATA COMMUNICATION USING AUDIO PORT

CROSS-REFERENCE TO RELATED APPLICATIONS

The application claims priority to U.S. Provisional Patent Application No. 61/953,454, filed May 14, 2014, which application is hereby incorporated herein by reference in its entirety.

BACKGROUND

A. Technical Field

The present invention relates generally to accessory management and data communication via an audio port on an electronic device.

B. Background of the Invention

Audio sockets have been commonly used in various electronic devices, such as computers, laptops, media players, smart phones, etc. to communicate with audio accessories having audio jacks. The mostly common used jack plugs have 2.5 mm, 3.5 mm or 6.35 mm (¼ inch) configurations with 2, 3 or 4 conductors for mono, stereo or stereo plus microphone compatibility. Stereo 3.5 mm jacks may be used for line in/out, headset out, loudspeaker out, microphone in, etc. Three-conductor connectors are common on older electronic devices, while 4-conductor 3.5 mm connectors are more commonly used on modern electronic devices, including most smart phones.

A 2-conductor jack is called TS connector with a tip and a sleeve for mono audio communication. A 3-conductor jack is called TRS connector with a tip, a ring and a sleeve for stereo audio communications. A 4-conductor jack is usually called TRRS connector with a tip, two rings and a sleeve for stereo plus microphone line communications. In certain circumstances, it is desirable to use a TRRS jack to transmit additional audio microphone signal to cellular phones.

Efforts have been done to explore further potential applications using audio jack connection. Given the variety in the audio accessories of different characteristics and preferred settings, it would be desirable to provide improved accessory management and data communication via audio port for supporting interactions between electronic devices and accessories.

SUMMARY OF THE INVENTION

The invention relates to accessory management and data communication, and more particularly, to systems and methods for accessory management and data communication between a portable electronic device and an accessory via audio port.

The method involves using a microphone line of the accessory in different communication modes including a MIC data mode and a power mode. In the MIC data mode, the MIC line disconnects from a microphone load to operate on a voltage above a predetermined threshold whenever the accessory needs to communicate with the host electronic device. In the MIC power mode, the MIC line connects with the microphone load for the normal operation of the microphone.

In certain embodiments, communication starts after the jack insertion is detected. The accessory's ID and audio jack configuration are initially checked. The audio jack configuration check verifies the type of the audio jack (TS, TRS or TRRS jack). For a TS or TRS jack, the MIC line is powered off. For a traditional TRRS jack without accessory ID, the MIC line is powered with a bias voltage. For a TRRS jack with accessory ID, the MIC line communication is detected by checking the MIC line floating voltage with a predetermined reference voltage. The communication on MIC line may be a 1-wire communication to power up the accessory and to allow communication and authentication at the same time. In some other embodiments, the method of communication with the MIC line superimposes the data line over the power line.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

FIG. 8 is a system operating region diagram according to various embodiments of the invention.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for the purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Various embodiments of the invention are used for accessory management and data communication via audio port in systems comprised of one or more integrated circuits (IC). An IC may be a memory, microcontroller, microprocessor, secure authenticator or any other devices within a system that communicates and/or receives information within the system. These systems, and the IC(s) therein, may be integrated on a single component or contain discrete components. Furthermore, embodiments of the invention are applicable to a diverse set of techniques and methods.

Figure 1:
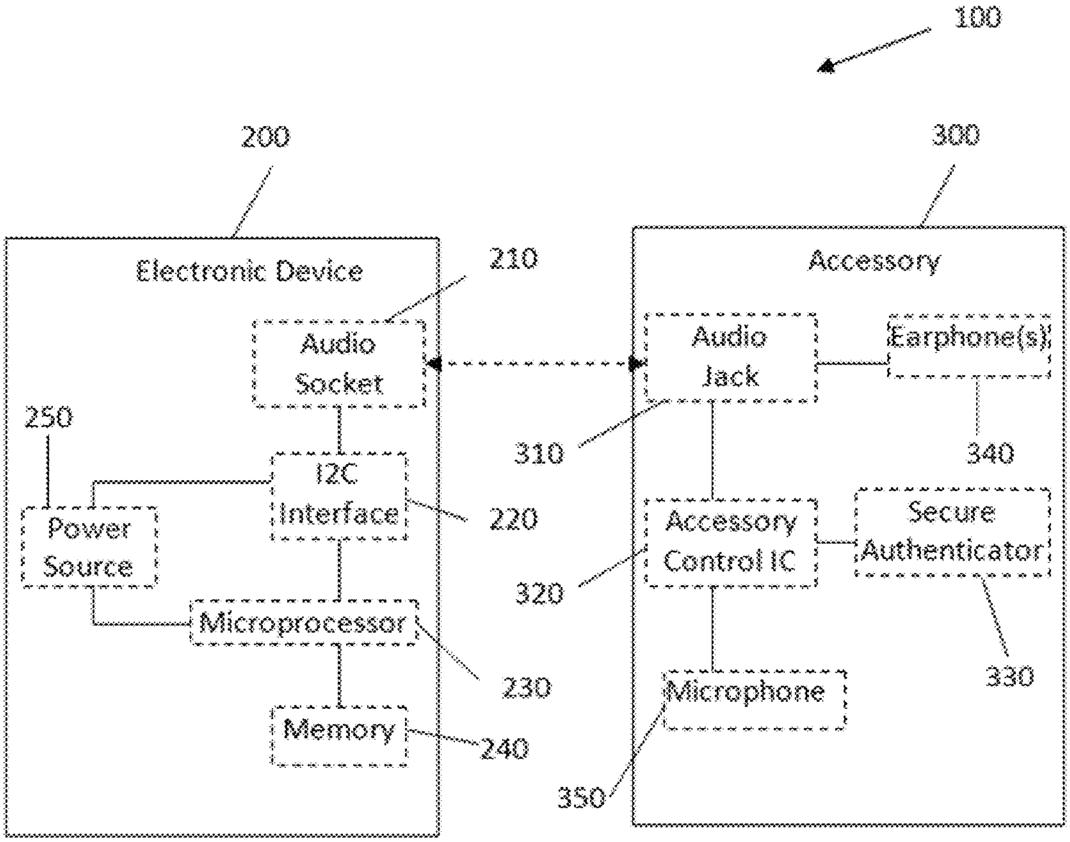
FIG. 1 is a schematic diagram of an electronic device in communication with an accessory in a system via an audio jack in accordance with an embodiment of the present invention.

FIG. 1 shows a schematic diagram of a system 100 according to various embodiments of the invention. The system 100 comprises an electronic device 200 in communication with an accessory 300. Communication between the two devices occurs on an audio jack 310 on the accessory 300 and an audio socket 210 on the electronic device 200.

The electronic device 200 may be a computer device, a laptop, a portable media player, such as a MP3 player, a cellular phone, etc. The accessory 300 may be an audio accessory such as a microphone, a headphone, loudspeakers, an audio amplifier, or be an electronic accessory having audio jack for voice and data communications. In an embodiment, the accessory 300 has a stereo or mono earphone and a microphone for audio input to the electronic device 200.

The audio jack 310 may have 2.5 mm, 3.5 mm or 6.35 mm (¼ inch) configurations with 2, 3 or 4 conductors (TS, TRS, TRRS) for mono, stereo or stereo plus microphone compatibility. The audio socket 210 may or may not have the matching configuration with the audio jack 310. For example, the audio socket is a TRRS socket, while the audio jack is a TRS jacket.

In one embodiment, the electronic device 200 has an audio socket 210, an I2C interface 220, a microprocessor 230, a memory 240, and a power source 250. The microprocessor 230 is configured to operatively connect to the I2C interface 220, the memory 240 and power source 250. The I2C interface 220 is an Inter-Integrated Circuit used for attaching peripheral audio socket 210 to the microprocessor 230. The memory 240 is configured to store a non-volatile computer readable logic or code for the implementation of desired function when the logic or code is executed by the microprocessor 230.

In one embodiment, the accessory 300 has an audio jack 310 and a mono or stereo earphone 340. In another embodiment, the accessory 300 also has a microphone 350 operatively connected to the audio jack 310. In another embodiment, the accessory 300 also has an accessory control IC 320 and a secure authenticator 330.

Figure 2:
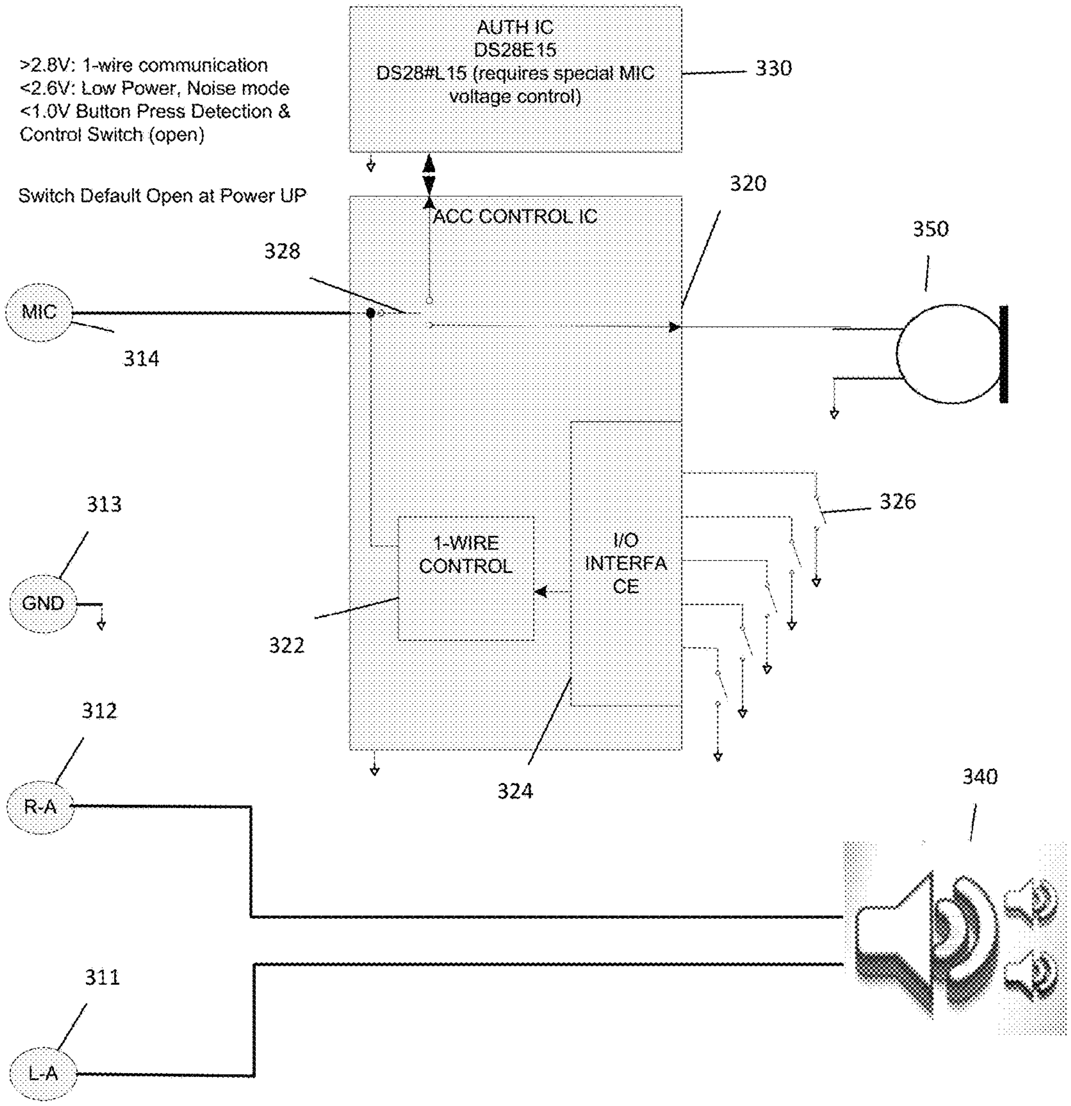
FIG. 2 is an exemplary accessory block diagram of an accessory according to various embodiments of the invention.
Figure 3:
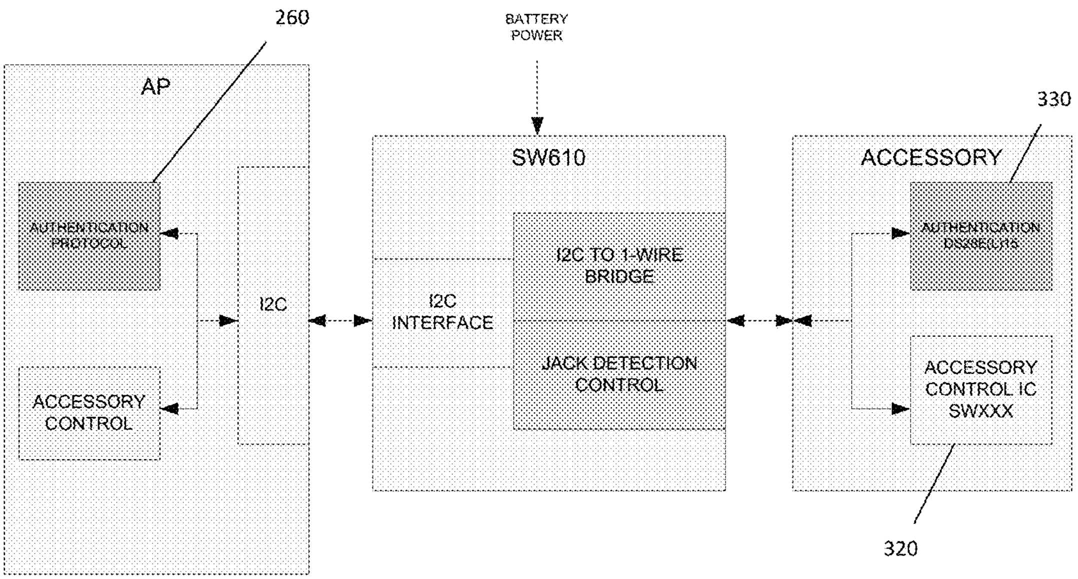
FIG. 3 is an exemplary block diagram of the electronic device in communication with an accessory according to various embodiments of the invention.

FIG. 2 illustrates an exemplary accessory block diagram of an accessory according to various embodiments of the invention. The accessory 300 has a TRRS audio jack 310, a stereo earphone 340, a microphone 350, an accessory control IC 320 and a secure authenticator 330. The audio jack 310 comprises stereo audio conductors 311 and 312 configured to connect to the stereo earphone 340, a ground conductor 313, and a MIC conductor (also referred as MIC line) 314. The accessory control IC 320 is configured to operatively connect to the MIC conductor 314, the microphone 350 and the secure authenticator 330. In another embodiment, the accessory 300 has its own power source, such as an accessory battery to provide power to the secure authenticator 330. The accessory control IC 320 comprises a MIC switch 328, a 1-wire control module 322 and an I/O interface 324. The I/O interface 324 is configured to connect to the MIC conductor 314 via the 1-wire control module 322 and to at least one external I/O port 326 of the accessory 300.

Figure 4:
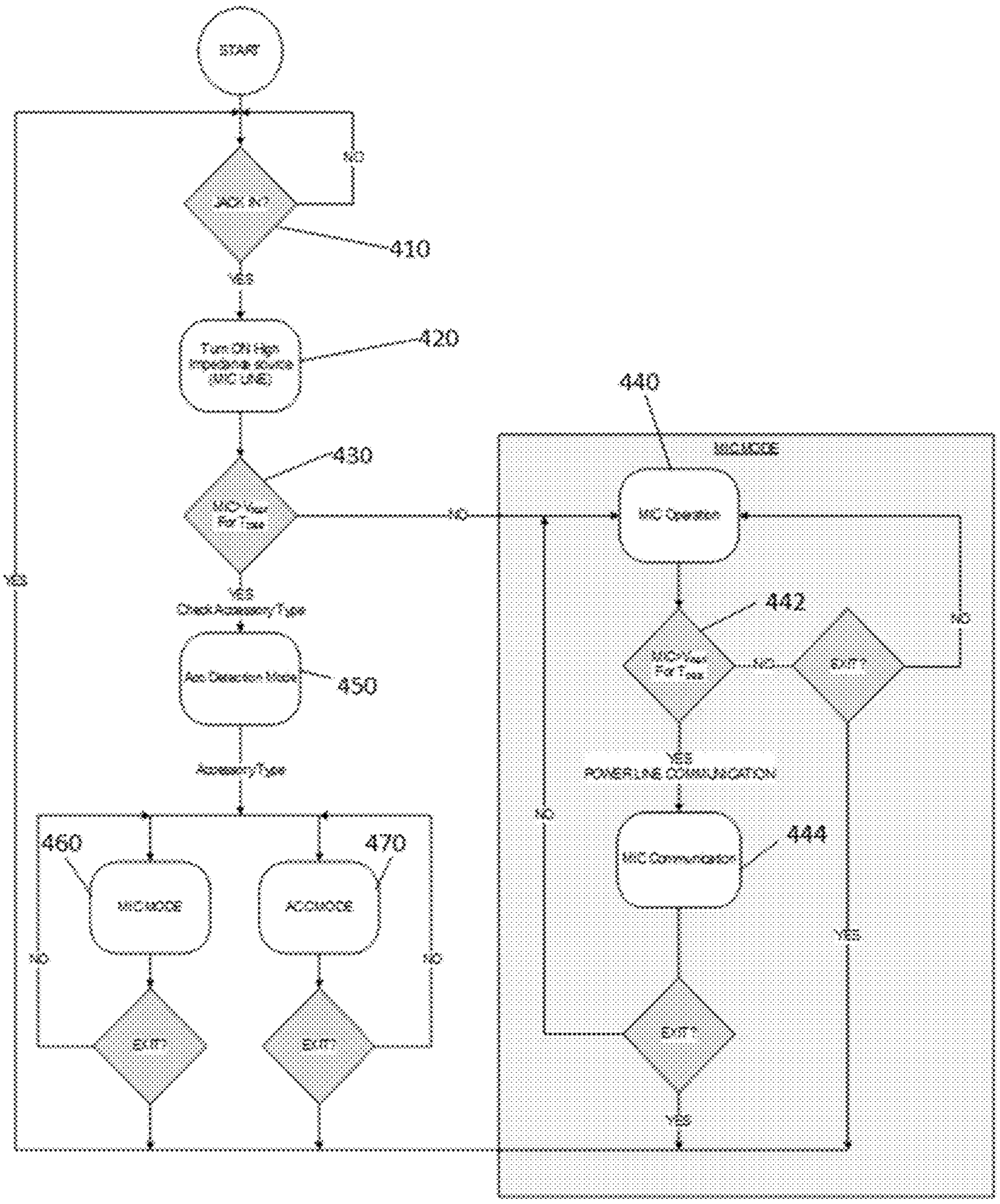
FIG. 4 is a flow diagram according to various embodiments of the invention.

FIG. 4 shows a flow diagram according to various embodiments of the invention. In step 410, communication starts after the jack insertion is detected. The microprocessor 230 is then operatively connected to the MIC line 314 through the audio socket 210 and I2C interface 220, and thus able to track the MIC line voltage. The microprocessor 230 is configured to turn on high impedance source (by applying a bias MIC line voltage) in step 420 and to compare the MIC line voltage to a predetermined reference voltage ($V_{Ref}$) in step 430. If the MIC line voltage is no higher than the reference voltage, the accessory communication enters MIC operation in step 440. If the MIC line voltage is higher than the reference voltage an accessory detection mode in step 450. In one embodiment, the reference voltage is set a specific voltage level value. In another embodiment, the reference voltage is set as 94% of very low dropout (VLDO) regulator output based on I2C communication PIO level.

Figure 5:
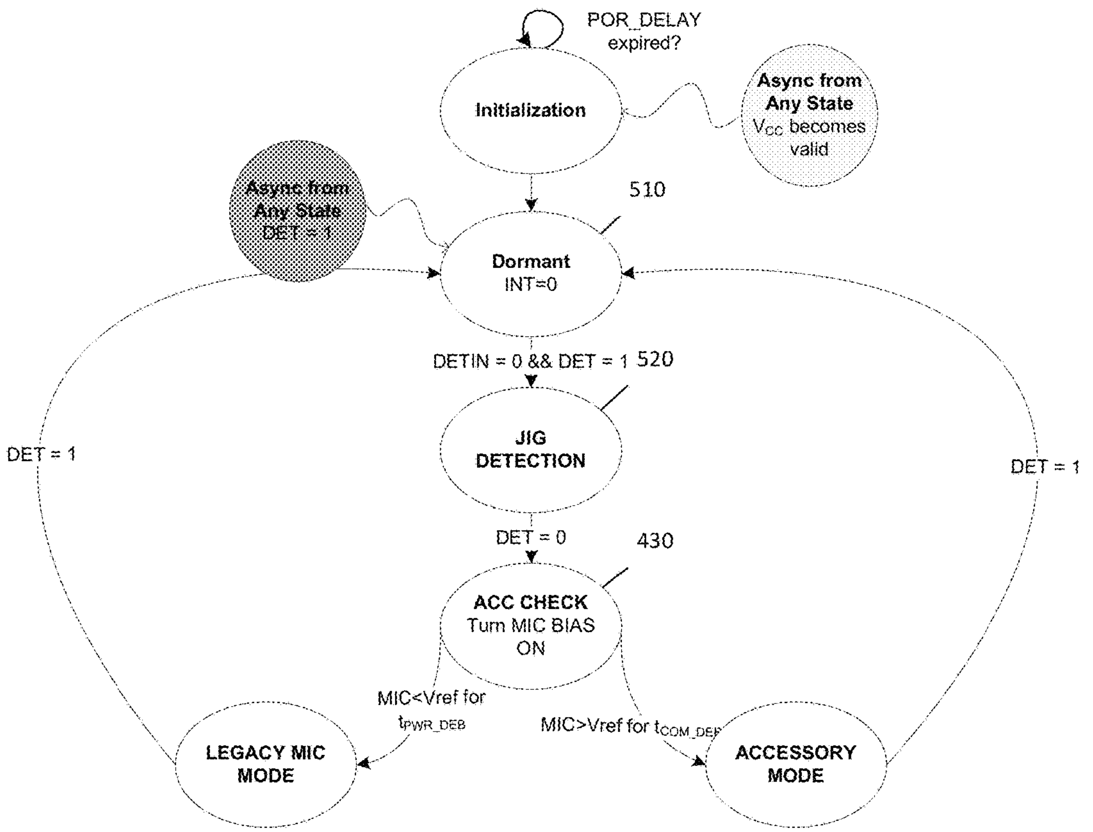
FIG. 5 is a system state diagram according to various embodiments of the invention.

FIG. 5 shows a system state diagram according to various embodiments of the invention. Whenever the electronic device 200 detects any types of audio jack insertion, the electronic accessory communication enters from a dormant state 510 into a JIG detection state 520. Upon passing the JIG detection, the electronic accessory communication enters an accessory check mode 430, wherein the microprocessor 230 of the electronic device 200 configures to turn on the MIC line bias voltage and track the MIC line voltage. The microprocessor 230 compares the MIC line to the predetermined reference voltage. Depending on the comparison results and other criteria, the electronic accessory communication enters either a MIC mode 460 (same as the Legacy MIC mode, MIC operation mode or MIC power mode 446) or an Accessory mode 470 (same as MIC data mode 444).

Figure 6:
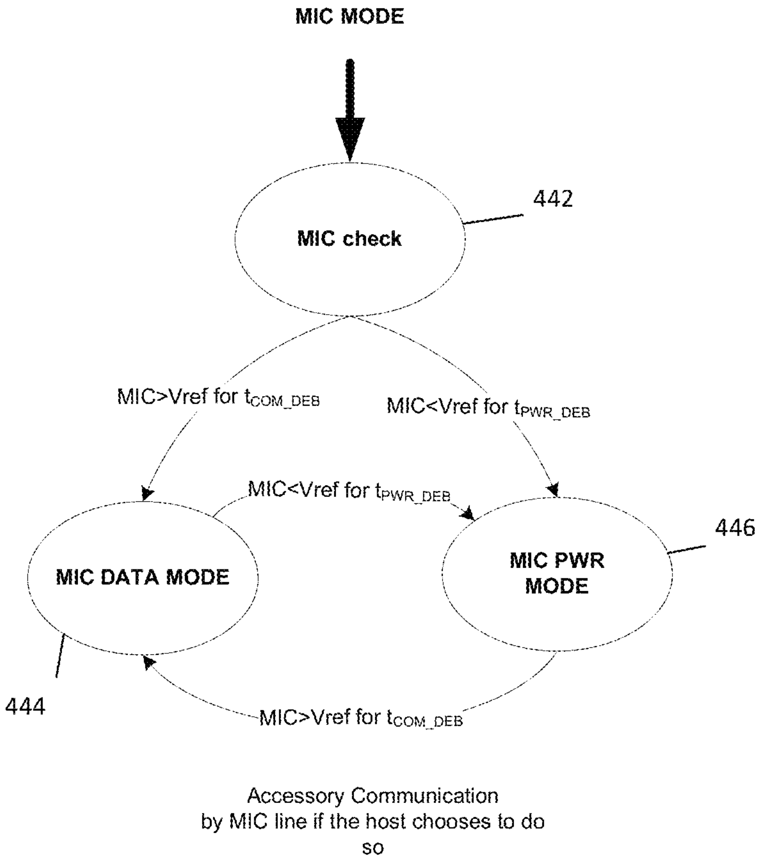
FIG. 6 is a block diagram when the accessory is in MIC mode according to various embodiments of the invention.

During the MIC operation in step 440, the microprocessor 350 constantly monitors the MIC line voltage and compares the MIC line voltage to the predetermined reference voltage ($V_{Ref}$) in step 442 (shown in both FIG. 4 and FIG. 6). If a first predetermined condition is met, the accessory communication enters into a MIC data mode in step 444. If a second predetermined condition is met, the accessory communication enters into a MIC power mode in step 446. The accessory 300 may switch from MIC data mode to MIC power mode if the second predetermined condition is met. Alternatively, the accessory 300 may also switch from MIC power mode to MIC data mode if the first predetermined condition is met. In one embodiment, the first predetermined condition is referred as the MIC line voltage higher than the reference voltage and lasted longer than a first predetermined time period during which the MIC line voltage remains above the reference voltage. In another embodiment, the second predetermined condition is referred as the MIC line voltage lower than the reference voltage and lasted longer than a second predetermined time period during which the MIC line voltage remains below the reference voltage.

FIG. 8 shows a system operating region diagram according to various embodiments of the invention. If the MIC line voltage is above the reference voltage, then accessory detection mode is activated. In this mode, a clock tracks a first time period during which the MIC line voltage remains above the reference voltage. If the first time period is greater than the first predetermined time period ($t_{COM\_DEB}$), the accessory communication enters a MIC communication mode during which data may be communicated across the audio jack. In certain embodiments, under the MIC communication mode (also referred as MIC data mode), the MIC switch 328 is deactivated (i.e., disconnection between MIC conductor 314 and the microphone 350) and the 1-wire control 322 is activated to operatively connect the MIC connector to the external I/O port 326 through the I/O interface 324. One skilled in the art will recognize that various implementations may be realized within the described architecture all of which fall within the scope of the invention. For example, the I/O port 326 may be used for various external control or communication functions, such as earphone volume up/down, media files forward/backward, etc.

If the MIC line voltage falls below the reference voltage, the clock is activated to track a second actual time period. When the second actual time period is greater than a second predetermined time period ($t_{PWR\_DEB}$), the accessory communication enters a MIC operation mode (also referred as MIC power mode) wherein the microphone 350 is operated to collect audio signal and transfer the collected audio signal to the electronic device 200. In certain embodiments, the MIC operation mode activates the MIC switch 328 and connects the MIC conductor 314 to the microphone 350. The 1-wire control 322 is in a sleep state to operatively disconnect the MIC connector to the external I/O port 326 through the I/O interface 324.

The accessory 300 may set the MIC line at high impedance that indicates its readiness for MIC communication mode or load the MIC line to indicate its readiness for exiting communication. The electronic device 200 may control the MIC supply with proper impedance (by setting desired bias MIC line voltage) for each operation mode and start or end the MIC communication mode if the predetermined MIC line condition for entering or leaving the MIC communication mode is met.

One skilled in the art will recognize that the above-described 1-wire communication mode is only one communication example. In another embodiment, a modulation AC operated above audible frequency may be adopted to superimpose the data line over the power line for MIC line data communication. In another embodiment, the accessory control IC 320 is configured to have the MIC switch to disconnect from the MIC signal coming from the microphone 350 such that the MIC data communication could use any frequency signal even in an audible frequency.

Figure 7:
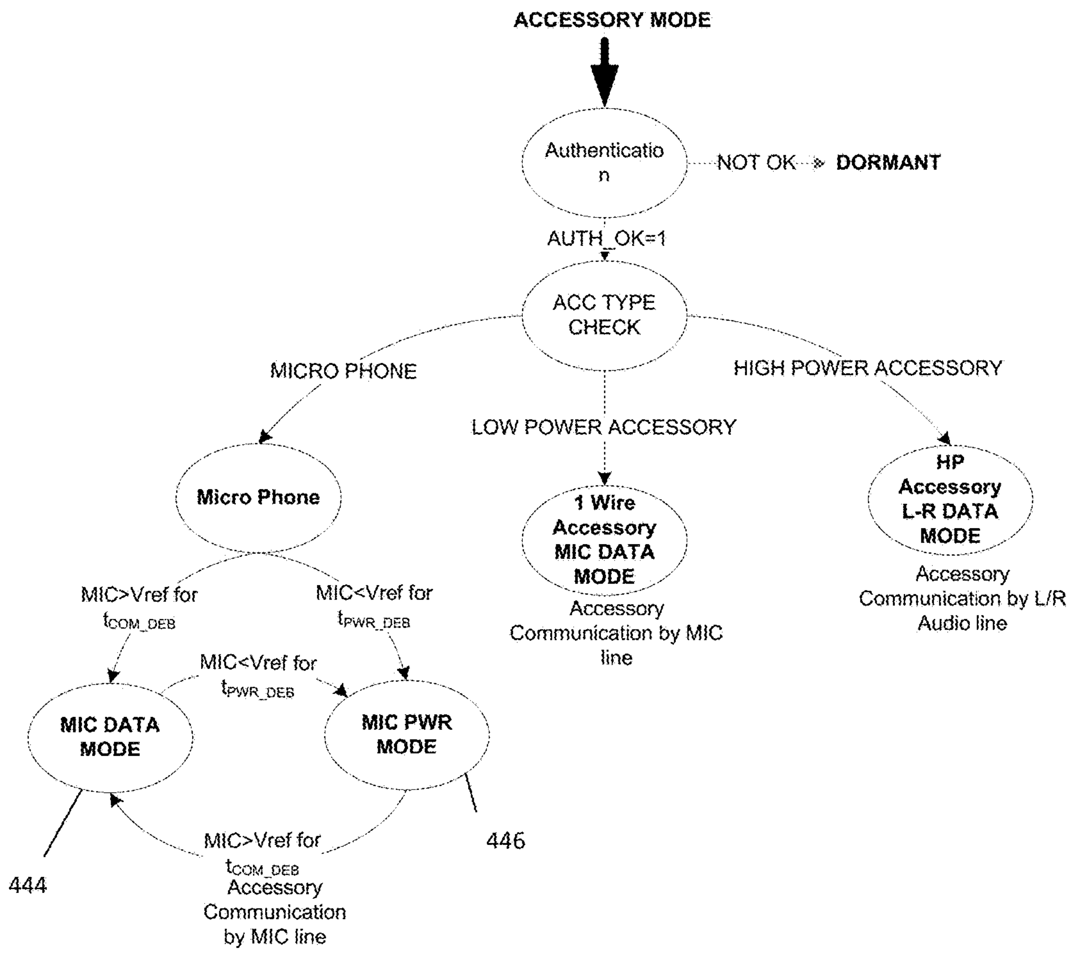
FIG. 7 is a block diagram when the accessory is in accessory mode according to various embodiments of the invention.

FIG. 7 illustrates a block diagram when the accessory is in an accessory mode according to another embodiment of the invention. An authentication check is done first on the accessory 300 with the operation of the secure authenticator 330 within the accessory and/or an authentication protocol 260 within the electronic device 200. If the authentication check is not passed, the accessory will enter a dormant mode without any further communication with the electronic device. If the authentication check is passed, the accessory 300 will get another accessory type check. Depending on the accessory type check based on drainage power level, the accessory 300 may operate in a high power accessory L_R data mode as a high power accessory using L/R Audio line (stereo audio conductors 311 and 312), or operate in a low power accessory MIC data mode as a low power accessory using MIC line. Alternatively the accessory 300 may operate in a MIC mode. Under MIC mode, the accessory may further operate in a MIC data mode or MIC power mode depending on the comparison between the MIC line voltage and the reference voltage, as described in the foregoing description.

The foregoing description of the invention has been described for purposes of clarity and understanding. It is not intended to limit the invention to the precise form disclosed. Various modifications may be possible within the scope and equivalence of the application.

The invention claimed is:

1. A method for accessory management and data communication via an audio socket on an electronic device, the method comprising:

detecting insertion of an audio jack from an accessory into the audio socket of the electronic device, the audio jack comprising a MIC line;

tracking the MIC line voltage;

comparing the MIC line voltage to a predetermined reference voltage to determine a mode of operation;

if the MIC line voltage is higher than the reference voltage and a first time period during which the MIC line voltage remains above the reference voltage is greater than a first predetermined time period, then data is communicated between the accessory and the electronic device; and if the MIC line voltage is less than the reference voltage and a second time period during which the MIC line voltage remains below the reference voltage is greater than a second predetermined time period, then audio is communicated between the accessory and the electronic device.

2. The method of claim 1 further comprising the step of turning on a high impedance source coupled to the MIC line after detection of the inserted audio jack.

3. The method of claim 1 wherein in the MIC data mode, a MIC switch within the accessory is operated to disconnect a microphone within the accessory to the electronic device.

4. The method of claim 1 wherein in the MIC data mode, a 1-wire control within the accessory is operated to couple an I/O interface within the accessory to the electronic device, wherein the I/O interface is connected to at least one I/O port for communications.

5. The method of claim 1 wherein in the MIC power mode, a MIC switch within the accessory is operated to connect a microphone within the accessory to the electronic device.

6. An electronic device for communication to an accessory, the device comprising:

a microprocessor;

an audio socket having a MIC line connector operatively coupled to the microprocessor;

a memory configured to store a non-volatile computer readable logic instructions executable by the microprocessor and cause the microprocessor to:

detect insertion of an audio jack from an accessory into the audio socket of the electronic device, wherein the audio jack comprises at least a MIC line;

track the MIC line voltage;

compare the MIC line voltage to a predetermined reference voltage, such that:

if the MIC line voltage is higher than the reference voltage and a first time period during which the MIC line voltage remains above the reference voltage is greater than a first predetermined time period, then data is communicated between the accessory and the electronic device; and if the MIC line voltage is less than the reference voltage and a second time period during which the MIC line voltage remains below the reference voltage is greater than a second predetermined time period, then audio is communicated between the accessory and the electronic device.

7. The electronic device of claim 6 wherein the microprocessor turns on a high impedance source coupled to the MIC line after the audio jack insertion detected.

8. The electronic device of claim 6 wherein in the MIC power mode, a microphone within the accessory is operated to collect audio signal and transfer the audio signal to the electronic device.

9. The electronic device of claim 6 wherein in the MIC data mode, a MIC switch within the accessory is operated to disconnect a microphone within the accessory to the electronic device.

10. The electronic device of claim 6 wherein in the MIC data mode, a 1-wire control within the accessory is coupled between an I/O interface within the accessory to the electronic device, wherein the I/O interface is connected to at least one I/O port for communications.

11. The electronic device of claim 6 wherein in the MIC power mode, a MIC switch within the accessory is operated to connect a microphone within the accessory to the electronic device.

12. An accessory for communication to an electronic device, the accessory comprising:

a MIC line removably connected to an audio socket of an electronic device;

an I/O interface connecting at least one I/O port; and a 1-wire control coupled between the MIC line and the I/O interface;

wherein after connection of the MIC line to the audio socket of the electronic device, if the MIC line has a voltage higher than a predetermined reference voltage and a first time period during which the MIC line voltage remains above the reference voltage is greater than a first predetermined time period, the accessory communicates to the electronic device in a MIC data mode; in the MIC date mode, the 1-wire control is activated to operatively connect the I/O interface to the electronic device for data communication.

13. The accessory of claim 12 further comprising a microphone and a MIC switch, such that:

if the MIC line has a voltage below the predetermined reference voltage greater than a second predetermined time period, the accessory communicates to the electronic device in a MIC power mode; in the MIC power mode, the MIC switch is closed to connect the microphone to the MIC line for audio signal collection and transfer to the electronic device.

14. The accessory of claim 13 wherein in the MIC power mode, the 1-wire control is in a sleep state to operatively disconnect the I/O interface to the MIC line and in the MIC date mode, the MIC switch is open to disconnect the microphone from the MIC line.

15. The accessory of claim 12 further comprising a secure authenticator that performs an authentication check after the connection of the MIC line to the audio socket of the electronic device, if the authentication check is not passed, the accessory enters a dormant mode without any further communication with the electronic device.

* * * * *